Sept. 14, 1948.    H. FRIEDMAN    2,449,066
ANALYSIS BY FLUORESCENT X-RAY EXCITATION
Filed July 19, 1946    2 Sheets-Sheet 1
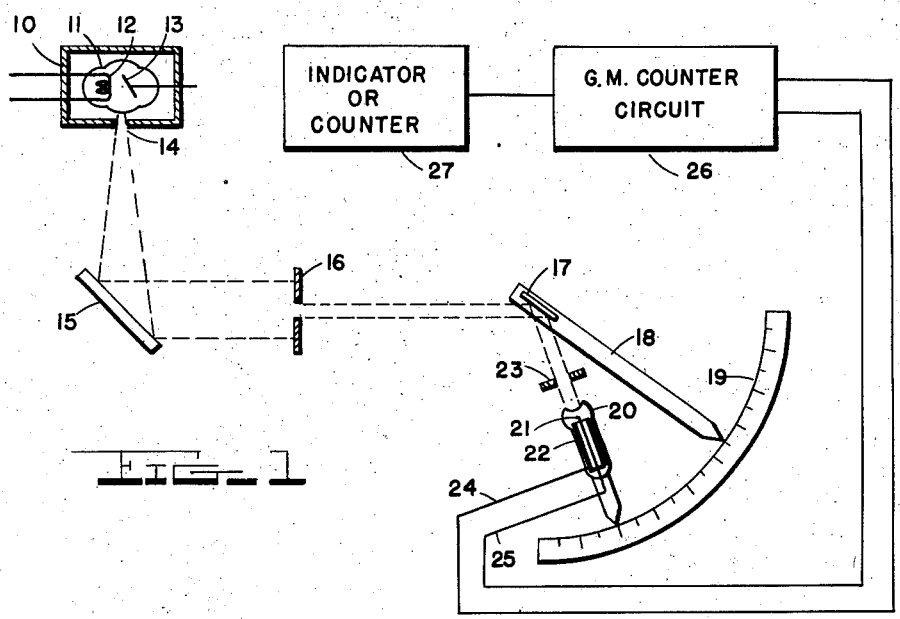
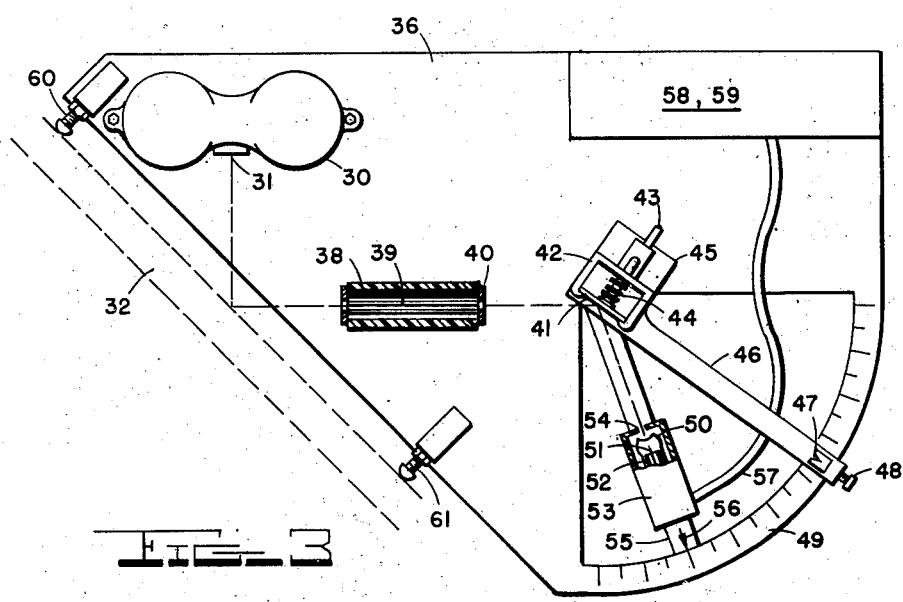
Inventor
HERBERT FRIEDMAN Sept. 14, 1948. H. FRIEDMAN 2,449,066
ANALYSIS BY FLUORESCENT X-RAY EXCITATION
Filed July 19, 1946 2 Sheets-Sheet 2

INVENTOR.
HERBERT FRIEDMAN
BY
ATTORNEY

Patented Sept. 14, 1948

2,449,066

UNITED STATES PATENT OFFICE 2,449,066

ANALYSIS BY FLUORESCENT X-RAY EXCITATION

Herbert Friedman, Arlington, Va.

Application July 19, 1946, Serial No. 684,908

9 Claims. (Cl. 250—71)

(Granted under the act of March 3, 1883, as amended April 30, 1928; 370 O. G. 757)

My invention relates to a method and apparatus for testing materials with X-rays and particularly to a method of conducting a qualitative and quantitative analysis of a material with X-rays.

The traditional classical method of conducting an analysis has been the so-called wet method. Samples of materials to be analyzed are dissolved, reacted, precipitated, dried, and weighed in the process of determining the amount of an element present in a sample. Relatively recently spectrographic analysis of alloys has become widely adopted in the metallurgical field. The method has suffered in popularity because of several variables which are extremely difficult to control. In some fields of chemistry, namely, the rubber and organic chemicals industry, qualitative analysis of composition and structure of organic chemical compounds have been carried out by X-ray diffraction methods.

It is an object of my invention to provide a method of conducting a quantitative analysis of any material.

It is a second object of my invention to provide a method of conducting a very rapid, non-destructive quantitative analysis of alloys.

It is a further object of my invention to provide a method of conducting a quantitative analysis of any part of a specimen non-destructively, for example, a weld joint of a structure.

It is a still further object of my invention to provide a non-destructive method for analyzing for the presence of any one or all of the elements present in an alloy so that no special preparation of the sample is required other than properly cleaning the surface.

Other objects and advantages of my invention will in part be obvious and in part appear hereinafter.

My invention, briefly stated, comprises a method of quantitative analysis involving the excitation of the fluorescent X-ray spectrum of a material, measuring the intensity of a monochromatized beam, and comparing this intensity with that produced using a specimen of known composition under similar conditions of radiation. The invention also includes the combination of elements of apparatus by means of which the analysis is carried out.

For a better understanding of my invention reference may be had to the accompanying drawings wherein:

Figure 1 is a block diagram illustrating the interrelationship of the component parts of the apparatus;

Figure 3 is an elevation of a portable embodiment of the apparatus.

Figure 2:
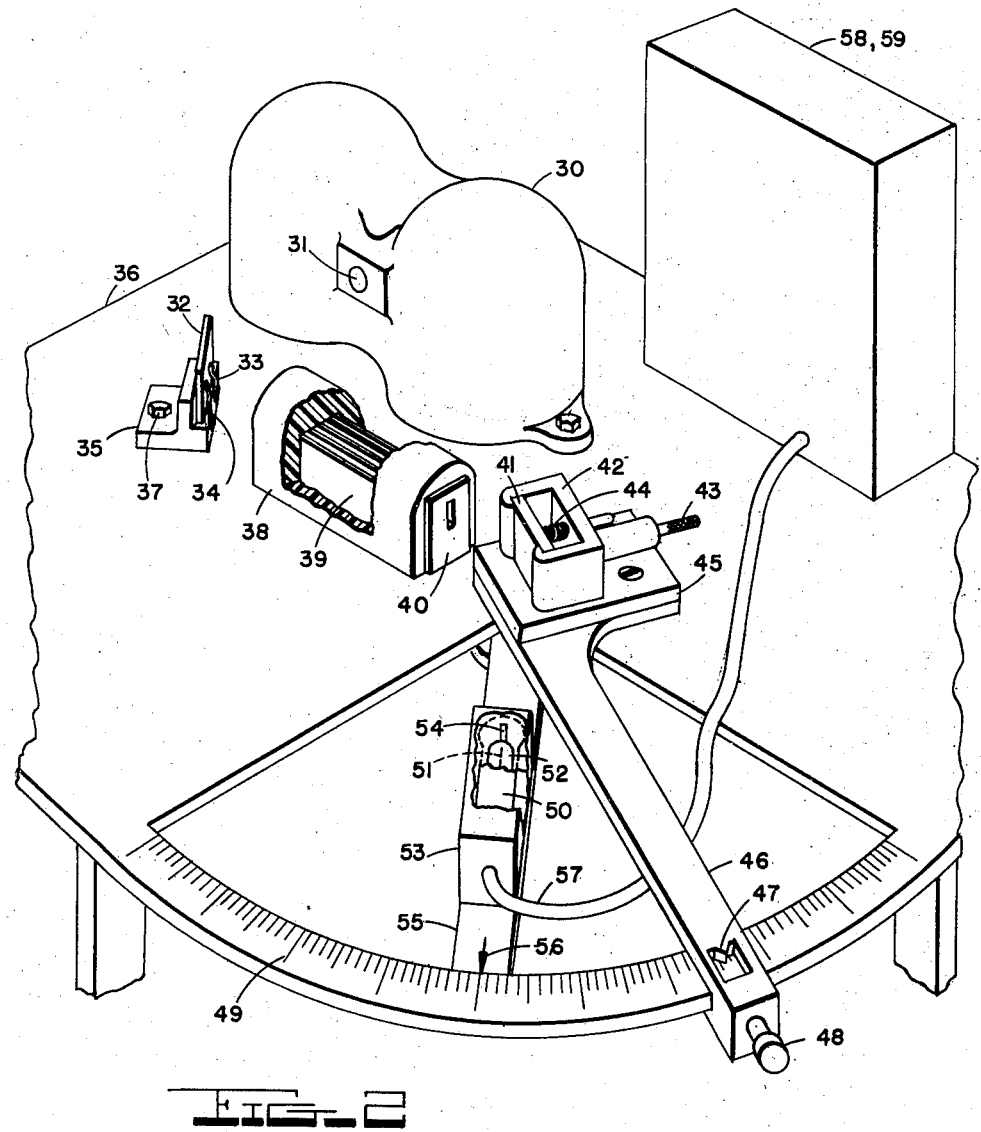
Figure 2 is a perspective drawing showing one embodiment of the apparatus.

In Figure 1 the shielded housing 10 encloses an X-ray tube 11 within which is the electron source filament 12 and a target 13 which is usually made of a metal such as copper, tungsten, or molybdenum. While no special X-ray tubes or targets are required for this equipment, it is essential that the target material and voltage be such that the fluorescent radiation of the element in the sample under analysis will be excited. A copper or molybdenum target is satisfactory in this regard for the analysis of alloys of steels, and of brass or bronze for constituent elements therein. The voltage applied across the X-ray tube may be from about 20 to 50 kilovolts depending upon the intensity of radiation to be used.

The X-rays produced pass through aperture 14 and strike the surface of the sample 15 to be analyzed. The sample thereupon emits a characteristic spectrum of radiation which is transmitted through collimating slit 16 into a narrow beam and onto crystal 17, which may be comprised of rock salt, calcite, quartz, or any material having similar X-ray reflective properties. The reflection of this beam from the crystal provides components of the beam at various angles to the normal determined by their respective frequencies because of the diffraction of the beam occurring within the crystal. Thus by rotating the crystal, the component corresponding to any given angle may be directed toward the detector 20.

Consequently an essentially monochromatic beam of radiation is reflected from crystal 17, the frequency of which depends upon the angular setting of the crystal which is indicated by arm 18 on scale 19. The reflected radiation is detected by Geiger-Mueller counter tube 20, comprising essentially anode wire 21 and cathode cylinder 22 in a glass envelope enclosing also a gaseous filling. Aperture 23 may be adjusted to control the amount of radiation entering the Geiger-Mueller counter. Leads 24 and 25 convey the detector impulses to the Geiger-Mueller counter circuit 26 wherein the pulses are converted to a voltage which is proportional to the number of pulses per second and is indicated or recorded in the corresponding instrument 27.

Figure 2 shows in perspective an assembly of equipment for analysis through the method described herein. In this drawing the X-ray source is enclosed in shielded housing 30, and the X-rays are emitted through aperture 31. The sample 32 is held in place by clips 33 and 34 on supporting block 35, which is affixed to base plate 36 by adjustable bolt 37. The fluorescent radiations from the sample 32 pass through collimator 38 which comprises a plurality of parallel vertical sheets of nickel foil 39 spaced about 0.5 millimeter apart. This may also take the form of a tightly-packed bundle of thin-walled, small diameter tubes, and its effect is to provide a narrow collimated beam of radiation which is passed through aperture 40 and projected upon the crystal surface 41. The crystal is supported in holder 42 which is so constructed that the reflecting face of the crystal may be held in a fixed position with respect to the X-ray beam. Adjustment 43 permits the crystal to be inserted in or removed from the holder, while the spring 44 maintains a pressure on the back of the crystal and holds it in position. The entire assembly is mounted on plate 45 which in turn is rigidly affixed to arm 46. The arm has an indicating pointer 47 and setscrew 48 which provide means for adjusting the angle of the crystal surface with respect to the incident X-ray beam. Scale 49 provides means for accurate angular placement of the crystal.

The detector for radiation comprises a Geiger-Mueller counter tube 50 having a wire anode 51 and a cylindrical cathode 52. The tube is enclosed in housing 53 for protection against stray radiations and has an aperture 54. The counter assembly is affixed to adjustable base 55 which provides a means for aligning the counter with the reflected beam from the crystal. Pointer 56 indicates the angle at which the centerline of the counter tube is set. A shielded lead 57 carries the counter impulses to counting and indicating or recording units 58 and 59.

In Figure 3, a portable embodiment of the invention is illustrated, in which parts similar to those of Figure 2 are numbered correspondingly. The base 36, on which component parts are mounted, is provided with adjustable spacers 60 and 61 to maintain a position of the assembly at a fixed distance from the sample 32 which in this case may be ship's plate, boiler plate, large casting, or the like. The remainder of the parts are the same as those in Figure 2, the only difference between the two embodiments being that the apparatus in Figure 3 is adjustable with respect to the sample, whereas the sample in Figure 2 is adjustable with respect to the remainder of the apparatus.

Substitution of an ionization chamber, a photographic plate or film, or any like radiation measuring device for the Geiger-Mueller counter may be made if desired. The Geiger-Mueller counter, however, has the advantage of a greater speed and ease of operation.

The X-ray source, in more detail, may consist of a standard 50,000 volt X-ray tube, using a target of copper, tungsten, or other appropriate metal. A copper target will excite fluorescent radiations in specimens containing iron, cobalt, nickel, managanese, silicon and chromium, and is therefore useful in the analysis of steel alloys. Other alloying elements, for example molybdenum, may require a tungsten target. The tube should be properly shielded so that radiations strike only the specimen being analyzed.

The metal sample to be analyzed should be rough ground to a flat surface and cleaned. It should then be mounted in such a manner as to be rotatable about a vertical axis. Secondary or fluorescent radiation produced on the metallic surface passes through collimator 38, which controls the approximate horizontal angle and quantity of radiation striking the crystal surface 41. Diffraction of this radiation at the atomic planes of the crystal gives a reflected beam of frequencies differing at different angles from the normal. A specific angular component of reflected radiation is sent through collimating slit 54 after reflection from the rotatable crystal and by this means a particular frequency of radiation reflected from the specimen may be selected for measurement by the Geiger-Mueller detector tube 50. Attached to the crystal mounting is a pointer 47 which may be used in connection with scale 49 for determining and for presetting the angle of the crystal with respect to the axis of the Geiger-Mueller counter tube 50. The settings of most interest are those corresponding to the Bragg angles for the particular element under examination.

The scale may be calibrated empirically with regard to a particular radiation, such as the $K_\alpha$ radiation, of a particular metal to be analyzed. By presetting the crystal at this angle a rapid and accurate means is achieved for selecting the constituent of an alloy or mixed specimen which is to be quantitatively measured.

The Geiger-Mueller counter tube 50 acts as the detecting element for the radiations reflected from the crystal. A preferable form of counter tube is the bubble window type having a gaseous filling of krypton with methylene bromide as a quenching vapor. The tube is mounted so that it may be rotated about its longitudinal axis, and it likewise may be shifted by adjustable clamps in its angular location with regard to the crystal.

The electrical impulses produced by the Geiger-Mueller counter tube are amplified, counted, and measured by the counter circuit 58. The output from this circuit may be utilized either as a direct indication or may be recorded or indicated by device 59.

In the operation of the equipment the sample is first prepared by rough grinding to a flat surface and then cleaning with a solvent to remove dirt, grease, and metal particles. It is next placed in the specimen holder of the apparatus and so adjusted that radiations from the X-ray source will impinge upon the surface and excite radiation therefrom which will pass to the crystal. The latter is aligned so that a monochromatic radiation may be detected by the Geiger-Mueller counter. The counter tube may then be located in such an angular relationship with the X-ray beam reflected from the crystal monochromator that any one of the series of radiations emitted from the specimen surface may be observed. In most cases it is preferable to detect and measure the $K_\alpha$ radiation, since this is the strongest of the several radiations for most metals. The frequency for the $K_\alpha$ radiation is different for each type of metal. Therefore, by properly locating the Geiger-Mueller detector tube the $K_\alpha$ radiation for any particular metal may be selectively determined. A direct relationship exists between the percentage of a given component in a composition of matter and the intensity of its radiation emitted at a particular wavelength; hence an observation may be made with an unknown sample, and the unknown sample may then be replaced with a material of known composition and a measurement of radiation intensity made under the same conditions. From the ratio of intensities an accurate evaluation of the amount of a particular element present in the unknown sample may be obtained.

A portable form of the apparatus hereinbefore described provides a rapid means for examining portions of large structures such as welds on ships or buildings, or sections of bulky castings, which could not otherwise be examined without removal of a representative sample, moreover, the method described herein is particularly effective for studying a metal surface which should not be destroyed, such as a welded joint or a casting. It possesses accuracy over a wide range, and may be used for the detection of as low as 0.001% of a component, and up to 100%. In comparison to chemical means this method saves considerable time.

Modifications of my invention other than as described in the foregoing explanation of equipment and method will be readily apparent to those skilled in the art and are included within my invention as defined in the appended claims.

The invention described herein may be manufactured and used by or for the Government of the United States of America for governmental purposes without the payment of any royalties thereon or therefor.

Having described my invention, what I claim as new and desire to secure by Letters Patent of the United States is:

1. The method of analyzing a material for constituent elements thereof comprising, exposing a specimen of said material to a beam of X-rays of a wavelength which excites the fluorescent X-ray spectrum of at least one of the elements of said specimen, monochromatizing a beam of said fluorescent radiation by reflection from a crystal surface, measuring the intensity of the reflected beam, comparing the intensity of said beam with the intensity of a like beam obtained in like manner from a material of known composition, thereby to obtain an indication of the composition of the unknown specimen.

2. The method of analyzing a material for a specific element thereof comprising, exposing a specimen of said material to a beam of X-rays of a wavelength which excites the fluorescent X-ray spectrum of said element, monochromatizing a beam of said fluorescent radiation by reflection from a crystal surface, measuring the intensity of the reflected beam, comparing the intensity of said beam with the intensity of a like beam obtained in like manner from a material of known composition, thereby to obtain an indication of the composition of the unknown specimen.

3. The method of analyzing a material for constituent elements thereof comprising, exposing a specimen of said material to a beam of X-rays of a wavelength which excites the fluorescent X-ray spectrum of at least one of the elements of said specimen, monochromatizing a beam of said fluorescent radiation by reflection from a crystal surface oriented to form the Bragg angle with the beam, measuring the intensity of the reflected beam, comparing the intensity of said beam with the intensity of a like beam obtained in like manner from a material of known composition, thereby to obtain an indication of the composition of the unknown specimen.

4. The method of analyzing a material for constituent elements thereof comprising, exposing a specimen of said material to a beam of X-rays of a wavelength which excites the fluorescent X-ray spectrum of at least one of the elements of said specimen, monochromatizing a beam of said fluorescent radiation by reflection from a crystal surface, measuring the intensity of the reflected beam to obtain a sensible signal proportional to the intensity, comparing the intensity of said beam with the intensity of a like beam obtained in like manner from a material of known composition, thereby to obtain an indication of the composition of the unknown specimen.

5. An apparatus for the analysis of materials for constituent elements thereof comprising, an X-ray source for generating X-rays to excite fluorescent radiation in a sample of the material, a rotatably mounted crystal monochromator, a fluorescent radiation collimator aligned between said sample and the monochromator, a radiation detector which receives radiation from said monochromator, said detector being mounted on an arc having a common center with the monochromator mount, and a device to indicate and record the intensity of the signal from the detector.

6. The method of quantitatively analyzing a material for an element or elements therein, comprising, exposing a specimen of said material to a beam of X-rays of a wavelength which excites the fluorescent X-ray spectrum of at least one of the elements of said specimen, monochromatizing a beam of said fluorescent radiation by reflection from a crystal, measuring the intensity of the reflected radiation by electronic counting, transforming the counter impulses into a sensible indication, comparing the intensity of said beam with the intensity of a like beam obtained in like manner from a material of known composition thereby to obtain an indication of the composition of the unknown specimen.

7. The method of qualitatively analyzing a material comprising, exposing a specimen of said material to a beam of X-rays of a wavelength which excites the fluorescent X-ray spectrum of at least one of the elements of said specimen, monochromatizing a beam of said fluorescent radiation, measuring the intensity of the monochromatized radiation by electronic counting, and transforming the counter impulses into a sensible indication, thereby to obtain an indication of the composition of the unknown specimen.

8. The method of analyzing steel alloys for the amount therein of iron and alloying elements such as nickel, chromium, manganese, silicon, cobalt, and molybdenum, comprising exposing a specimen of said alloy to a beam of X-rays of a wavelength which excites the fluorescent X-ray spectrum of at least one of the elements of said alloy, monochromatizing a beam of said fluorescent radiation by reflection from a crystal surface, measuring the intensity of the reflected beam, comparing the intensity of said beam with the intensity of a like beam obtained in like manner from a material of known composition, thereby to obtain an indication of the composition of the unknown alloy.

9. An apparatus for the analysis of materials for constituent elements thereof comprising an X-ray source for generating X-rays to excite fluorescent radiation in a sample of the material, positioning means for locating a sample with respect to the source for fluorescence, collimating means for receiving the fluorescent radiation, and means for analysing the spectrum of the collimated radiation positioned to receive the collimated radiation.

HERBERT FRIEDMAN.

REFERENCES CITED

The following references are of record in the file of this patent:

UNITED STATES PATENTS

| Number | Name | Date |
|---|---|---|
| 1,546,348 | Hull et al. | July 14, 1925 |
| 1,589,833 | Behnken et al. | June 22, 1926 |
| 2,025,488 | Yap | Dec. 24, 1935 |
| 2,386,785 | Friedman | Oct. 16, 1945 |